(12) United States Patent
Stewart

(10) Patent No.: US 7,936,272 B2
(45) Date of Patent: May 3, 2011

(54) DYNAMIC ANTENNA TUNING CIRCUIT FOR A RADIO FREQUENCY IDENTIFICATION READER

(75) Inventor: Robert Stewart, Boulder, CO (US)

(73) Assignee: Allflex USA, Inc., Dallas-Ft. Worth Airport, TX (US)

( * ) Notice: Subject to any disclaimer, the term of this patent is extended or adjusted under 35 U.S.C. 154(b) by 0 days.

(21) Appl. No.: 12/431,879

(22) Filed: Apr. 29, 2009

(65) Prior Publication Data

US 2009/0206999 A1    Aug. 20, 2009

Related U.S. Application Data

(63) Continuation-in-part of application No. 11/479,816, filed on Jun. 29, 2006, now Pat. No. 7,528,725.

(51) Int. Cl.
*G08B 13/14* (2006.01)

(52) U.S. Cl. .............. 340/572.5; 340/10.1; 340/505; 340/539.1; 340/572.1; 340/572.8

(58) Field of Classification Search ............. 340/572.5, 340/10.1, 505, 539.1, 572.1, 572.7, 572.8, 340/539.11
See application file for complete search history.

(56) References Cited

U.S. PATENT DOCUMENTS

| | | | |
|---|---|---|---|
| 3,299,424 A | 1/1967 | Vinding | |
| 3,713,146 A | 1/1973 | Carroll et al. | |
| 4,551,712 A | 11/1985 | Fockens | |
| 5,053,774 A | 10/1991 | Schuermann et al. | |
| 5,168,282 A | 12/1992 | Viereck | |
| 5,289,199 A | 2/1994 | Viereck | |
| 7,323,977 B2 | 1/2008 | Kodukula et al. | |
| 7,353,997 B2 | 4/2008 | Tikhov et al. | |
| 7,528,725 B2 * | 5/2009 | Stewart | 340/572.5 |
| 2007/0013483 A1 | 1/2007 | Stewart | |
| 2007/0046369 A1 | 3/2007 | Schober et al. | |
| 2007/0057797 A1 | 3/2007 | Waldner et al. | |
| 2008/0012712 A1 | 1/2008 | Shimizu | |
| 2008/0150689 A1 | 6/2008 | Chiu et al. | |
| 2008/0280581 A1 | 11/2008 | Rofougaran et al. | |

FOREIGN PATENT DOCUMENTS

| | | |
|---|---|---|
| EP | 0681192 | 11/1995 |
| EP | 1884881 | 2/2008 |

OTHER PUBLICATIONS

Allflex USA, Inc., PCT Search Report and Written Opinion mailed Mar. 25, 2010, PCT Application No. PCT/US2009/066135 filed Nov. 30, 2009.

* cited by examiner

*Primary Examiner* — Daryl Pope
(74) *Attorney, Agent, or Firm* — Blakely, Sokoloff, Taylor & Zafman LLP

(57) ABSTRACT

A resonant antenna circuit for a radio frequency identification (RFID) reader generates an electrical signal for activating a passive identification tag. The identification tag in turn generates a coded electrical signal that is detected by the reader. The electrical characteristics of the resonant circuit are actively and dynamically altered so that the antenna performs more optimally during the transmit and receive intervals.

11 Claims, 5 Drawing Sheets

$F_{RT} = 1/(2\pi\sqrt{LC})$ $F_{RR} = 1/[2\pi\sqrt{(L+L_T)C}]$ $L_S = L_T + L \qquad L_S > L$ $L_P = 1 / [\, 1/L_T + 1/L \,] \qquad L_P < L$ $C_S = 1 / [\, 1/C_T + 1/C \,] \qquad C_S < C$ $C_P = C_T + C \qquad C_P > C$ $F_{RT} = 1/[2\pi\sqrt{L\,(C + C_T)}]$ $F_{RR} = 1/(2\pi\sqrt{LC})$

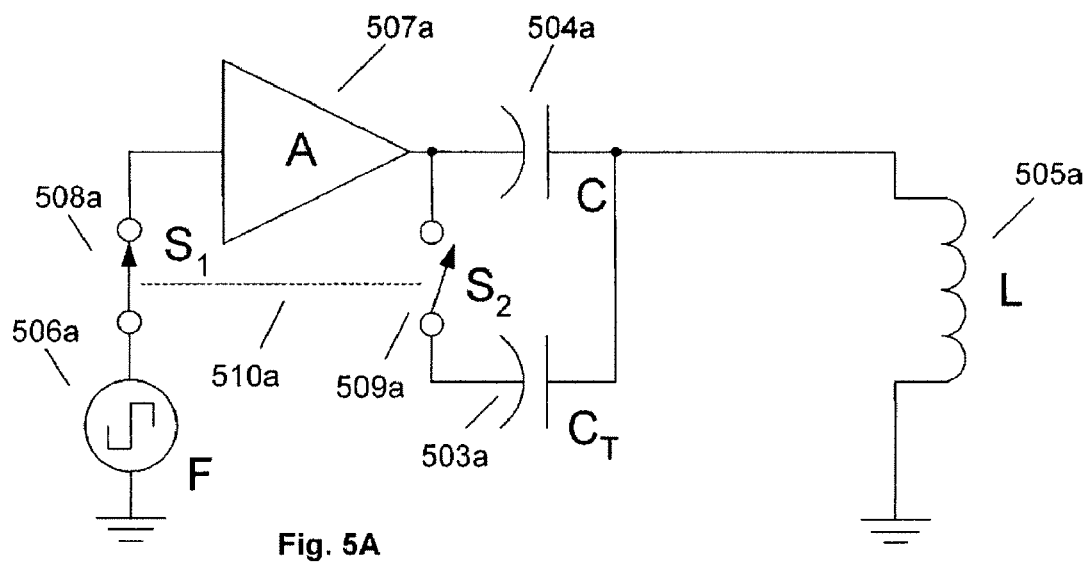
Fig. 5A
| $S_1$ | $S_2$ | F |
|---|---|---|
| CLOSE | OPEN | $F_{RT} = 1/(2\pi\sqrt{LC})$ |
| OPEN | CLOSE | $F_{RR} = 1/[2\pi\sqrt{L(C+C_T)}]$ |
Fig. 5B
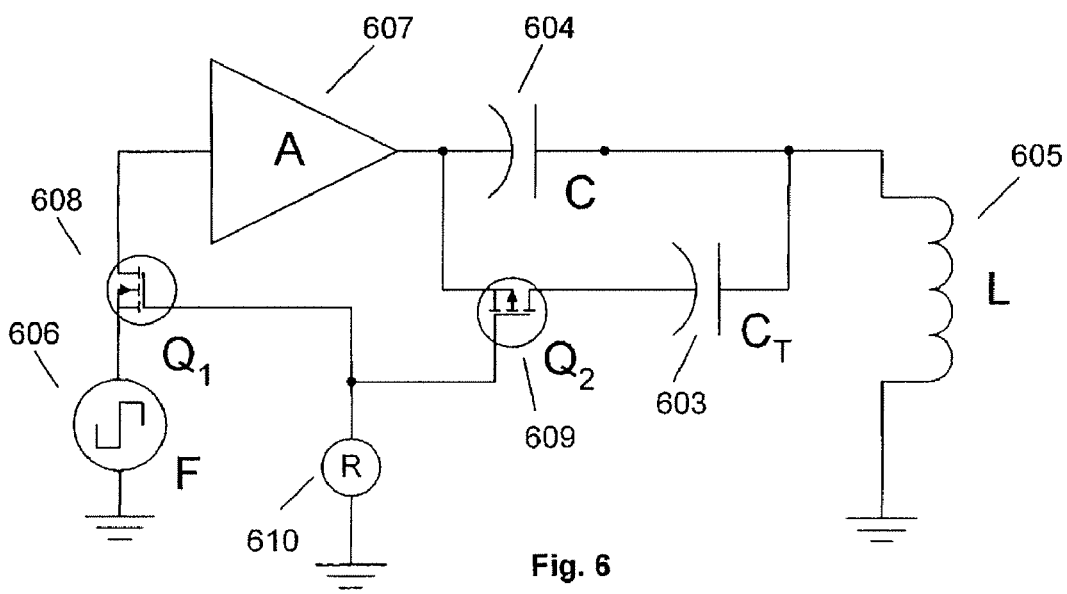
Fig. 6

DYNAMIC ANTENNA TUNING CIRCUIT FOR A RADIO FREQUENCY IDENTIFICATION READER

RELATED APPLICATION

This is a continuation-in-part of application Ser. No. 11/479,816 filed Jun. 29, 2006, the disclosure of which is incorporated herein by reference.

FIELD OF THE INVENTION

This invention relates to radio frequency identification (RFID) systems, and more particularly to an RFID reader with a dynamic antenna tuning circuit.

BACKGROUND OF THE INVENTION

The parent application identified above disclosed an electronic circuit that alters, in a passive and dynamic manner, the resonant frequency tuning of a radio transceiver's antenna circuit, comprising an inductor and capacitor. More specifically, the function of the antenna circuit disclosed therein is the radio transceiver's transmitting and receiving transducer that interacts with a passive identification transponder, generally known as a "half-duplex", or "HDX" type transponder. In transponders of the HDX variety, the radio transceiver transmits an activation signal to the transponder via its resonant antenna circuit during a first interval (the transmit interval), and receives the transponder's data signal via its resonant antenna circuit during a second interval (the receive interval) when the radio transceiver's transmit signal is squelched.

In the particular embodiments described in the parent application, the radio transceiver transmits an activation signal comprising a radio frequency of 134.2 KHz, and receives frequency shift keyed (FSK) modulation comprising the frequencies 134.2 KHz and 124.2 KHz to convey binary data from the HDX transponder. The parent application describes in detail how the radio transceiver operates more efficiently when the resonant antenna circuit is tuned to 134.2 KHz during the transmit interval, and tuned nominally to 129.2 KHz (mid-point between the HDX transponder's FSK data frequencies) during the receive interval.

As shown in FIG. 1A (corresponding to FIG. 4A of the parent application), the tuning of the radio transceiver's resonant antenna circuit is shifted from 134.2 KHz during the transmit interval to 129.2 KHz during the receive interval, through the use of three passive components, diodes $D_1$ [101a], $D_2$ [102a], and inductor $L_T$ [103a]. During the transmit interval, the transmit signal F [106a] is conducted through diodes $D_1$ [101a] and $D_2$ [102a], such that inductor $L_T$ [103a] is electrically bypassed, or shorted, and the antenna's resonant frequency tuning is determined by the capacitor C [104a] and antenna inductor L [105a]. Subsequently, during the receive interval, when there is no transmit signal F [106a] present, diodes $D_1$ [101a] and $D_2$ [102a] become open circuits such that inductor $L_T$ [103a] is electrically inserted in the resonant circuit. Thus, the antenna's resonant frequency tuning is determined by the capacitor C [104a] and the series combination of antenna inductor L [105a] and inductor $L_T$ [103a].

As is well understood by those of ordinary skill in the art, the resonant frequency of the inductor L [105b]/capacitor C [104b] tuned circuit, as shown in FIG. 1B, is:

$$F_{RT}=1/[2\pi\sqrt{LC}]$$

Thus, as is disclosed in detail in the parent application, the resonant frequency of the antenna circuit is defined by the above equation during the transmit interval when inductor $L_T$ [103a] is electrically bypassed, and becomes $$F_{RR}=1/[2\pi\sqrt{(L+L_T)C}]$$

during the receive interval when inductor $L_T$ [103c] is electrically inserted in the resonant circuit, as shown in FIG. 1C. Consequently, by selecting an appropriate inductance value for inductor $L_T$ [103c], the resonant frequency tuning of the antenna circuit can be shifted in a passive and dynamic manner between $F_{RT}$=134.2 KHz during the transmit interval, and $F_{RR}$=129.2 KHz during the receive interval.

As was further disclosed in the parent application, the advantage of the electrical frequency shifting circuit comprising diodes $D_1$ [101a], $D_2$ [102a], and inductor $L_T$ [103a] is its simplicity, low cost, and high reliability. However, there exist alternate embodiments that accomplish this frequency shifting technique, and although not passive, are equally effective in achieving an equivalent result. These alternate methods comprise the subject matter of the present continuation-in-part invention.

SUMMARY OF THE INVENTION

The present invention discloses embodiments for dynamically shifting the resonant frequency tuning of the antenna using active switching techniques. For simplicity, discussion is limited to operation with the HDX transponder that has been defined herein. That is, a transponder having FSK frequencies consisting of $F_1$ and $F_2$ where $F_1$ is nominally the same as the transponder's activation signal frequency, and $F_2$ is a frequency less than (i.e., lower than) frequency $F_1$. A person of ordinary skill in the art can immediately apply the principles of the present invention to an application wherein the transponder's second FSK frequency $F_2$ is greater (i.e., higher) than frequency $F_1$. Modifications made to the present invention prerequisite to its application to such an alternative fall within the scope of the present invention's disclosure and appended claims.

BRIEF DESCRIPTION OF THE DRAWINGS

FIGS. 5A and 5B illustrate the actively switched capacitor tuning arrangement of the present invention.

FIG. 6 is a circuit diagram of an embodiment of the present invention.

DETAILED DESCRIPTION OF THE INVENTION

In the following description, for purposes of explanation and not limitation, specific details are set forth in order to provide a thorough understanding of the present invention.

However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Figure 1A:
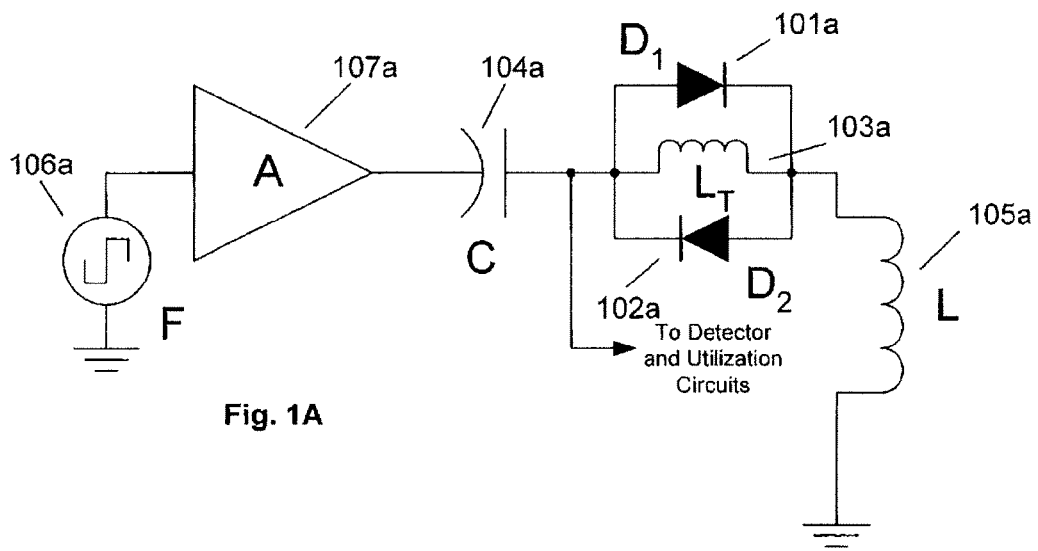
FIG. 1A illustrates the passive dynamic antenna tuning circuit of the parent application.
Figure 1B:
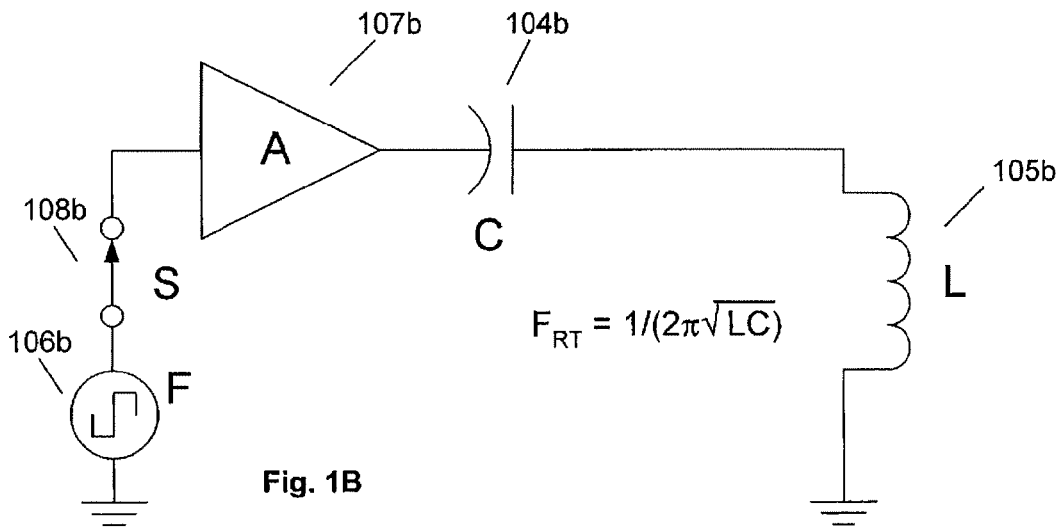
FIGS. 1B and 1C are equivalent electrical circuits corresponding to the circuit of FIG. 1A during transmit and receive intervals, respectively.
Figure 1C:
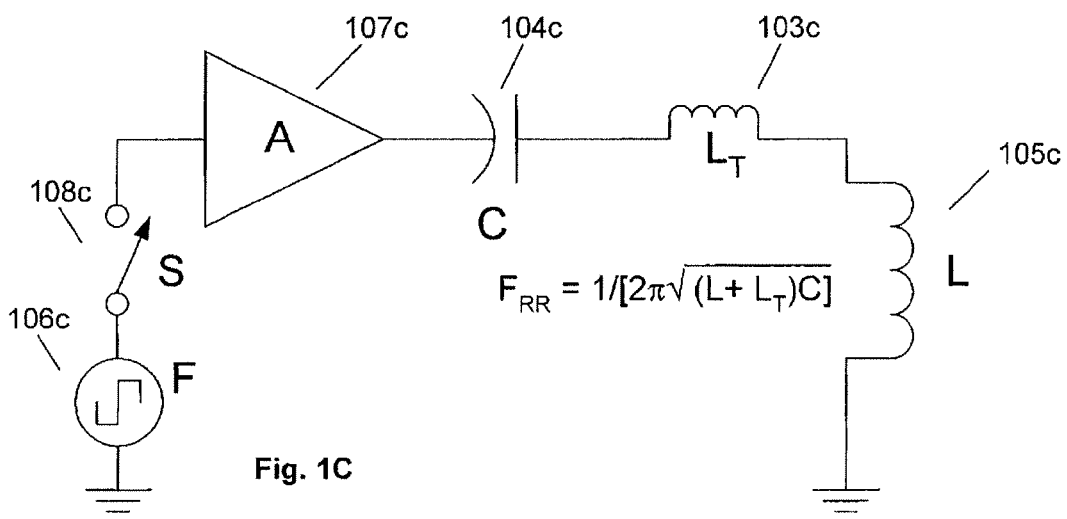

As previously discussed, FIG. 1A illustrates the fundamental circuit arrangement of the parent application, and FIGS. 1B and 1C illustrate the equivalent electrical circuits corresponding to the transmit and receive intervals, respectively. For greater clarity, FIGS. 1B and 1C are shown to include switch S [108b, 108c] which represents the on/off state of the activation signal. In FIG. 1B, switch S [108b] is closed, which applies activation signal source F [106b] through amplifier A [107b] to the resonant antenna circuit comprising capacitor C [104b] and antenna inductor L [105b]. With switch S [108b] closed, diodes $D_1$ [101a] and $D_2$ [102a] bypass inductor $L_T$ [103a], resulting in the equivalent circuit shown (FIG. 1B). In FIG. 1C, switch S [108c] is open, which removes activation signal source F [106c] from amplifier A [107c] and resonant antenna circuit C [104c] and L [105c]. With switch S [108c] open, diodes $D_1$ [101a] and $D_2$ [102a] become open circuits that electrically insert inductor $L_T$ [103c], resulting in the equivalent circuit shown (FIG. 1C). Thus, FIGS. 1B and 1C correlate the on/off state of switch S [108b, 108c] with the electrical absence/presence of inductor $L_T$ [103a] in the resonant antenna circuit.

Figure 2A:
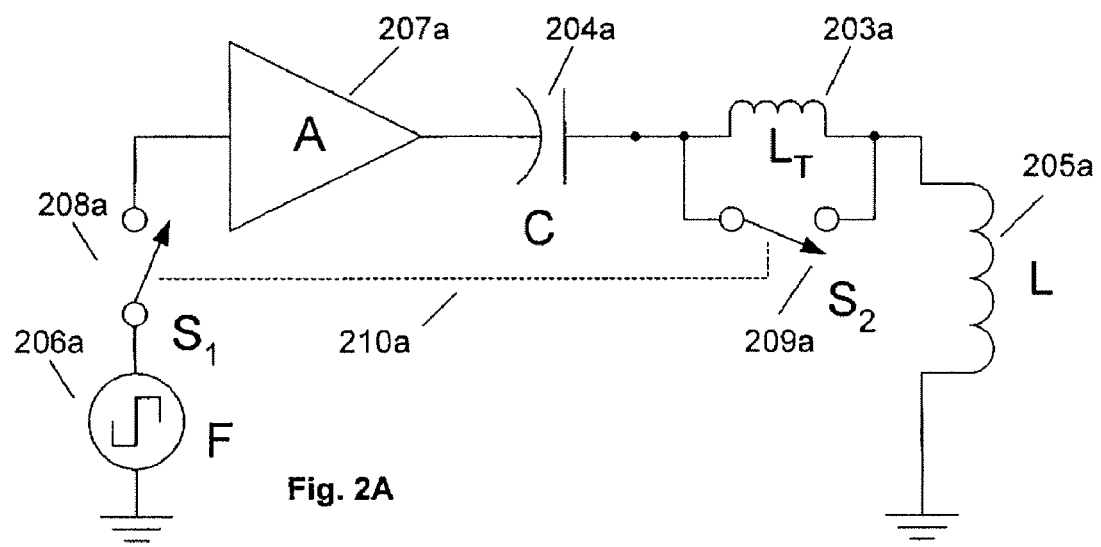
FIGS. 2A and 2B illustrate an embodiment of the present invention implemented with actively switched circuit elements.

An alternate equivalent circuit representation is shown in FIG. 2A, where the diodes $D_1$ [101a] and $D_2$ [102a] of FIG. 1A are replaced by switch $S_2$ [209a]. Switch $S_1$ [208a] and switch $S_2$ [209a] are shown connected by a dashed line [210a] to indicate that the two switches operate synchronously. That is, both switches close and open in unison and in phase. Correspondingly, when the activation signal F [206a] is made present by closing switch $S_1$ [208a], switch $S_2$ [209a] simultaneously closes, thus bypassing inductor $L_T$ [203a]. And when switch $S_1$ [208a] opens, switch $S_2$ simultaneously opens, thus inserting inductor $L_T$ [203a]. Consequently, the action of switch $S_2$ [209a] produces the same result as diodes $D_1$ [101a] and $D_2$ [102a] produce in FIGS. 1A-C.

Figure 2B:
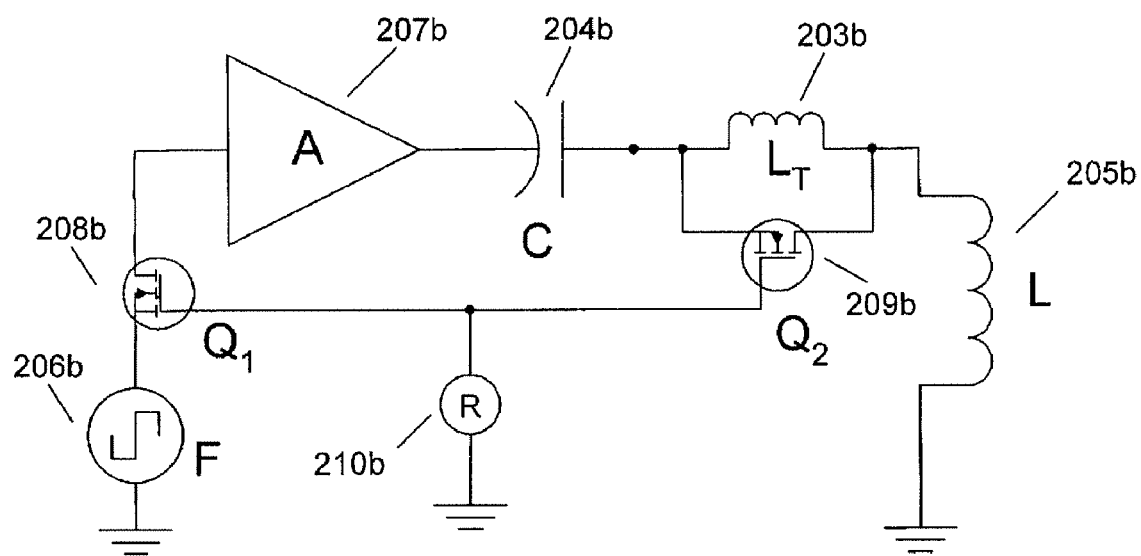

While shown schematically in FIG. 2A as electromechanical switches, in practice switches $S_1$ [208a] and $S_2$ [209a] are implemented with semiconductor devices, such as MOSFET transistors, as shown in FIG. 2B. Switch $S_1$ [208a] is replaced by transistor $Q_1$ [208b] and switch $S_2$ [209a] is replaced by transistor $Q_2$ [209b]. An electrical pulse signal R [210b] applies a signal to transistors $Q_1$ [208b] and $Q_2$ [209b] causing them to switch on and off, thus causing their conduction pathways to open and close synchronously in order to produce an equivalent switching action as was described in relation to switches $S_1$ [208a] and $S_2$ [209a].

While more complicated and expensive, the active dynamic switching arrangement depicted in FIG. 2B nevertheless produces an equivalent shift in antenna resonance tuning as is required for operation with the HDX transponder of interest to the present invention.

Figure 3A:
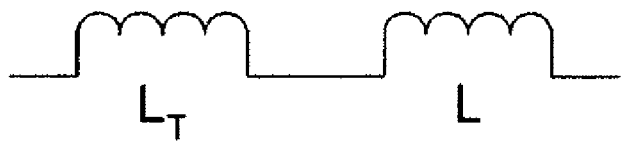
FIGS. 3A-3D illustrate the four series and parallel wiring arrangements for inductors and capacitors, and provides respective equations for the effective inductance and capacitance of each.
Figure 3B:
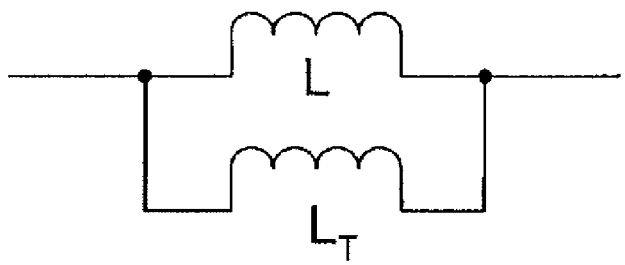
Figure 3C:
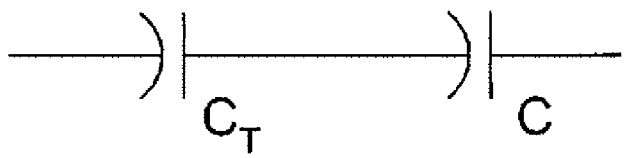
Figure 3D:
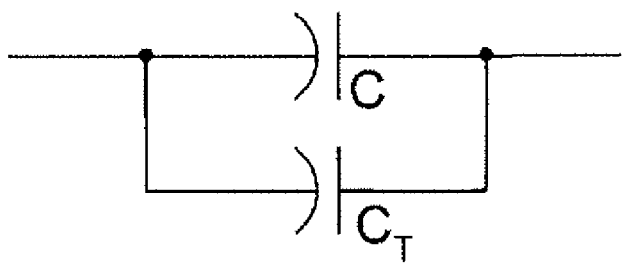

Inspection of the equation relating resonant frequency to inductance and capacitance, $$F_R = 1/[2\pi\sqrt{LC}]$$

reveals that either an inductance $L_T$ or a capacitance $C_T$ can be used to shift the frequency of the resonant antenna circuit. FIGS. 3A-3D illustrate series and parallel wiring arrangements of inductors and capacitors and provide equations for the composite inductance and capacitance values. While four alternatives exist, only circuits FIG. 3A and FIG. 3D are practicable for the purpose of the present invention. The principal disadvantage of circuits FIG. 3B and FIG. 3C is that they require disproportionately large component values for $L_T$ and $C_T$ to provide the desired degree of frequency shift.

From the resonant circuit equation immediately above, and referring to FIG. 1A, one can conclude that an alternative to inserting an inductor $L_T$ [103a] in series with antenna inductor L [105a] during the receive interval is to insert an additional capacitor in parallel with capacitor C [104a].

Figure 4A:
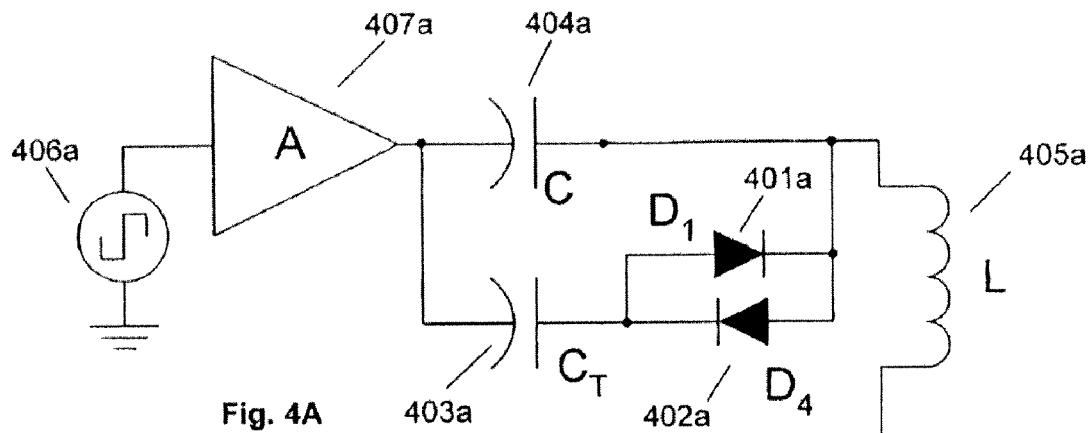
FIGS. 4A-4C illustrate a parallel capacitor arrangement connected with passive diodes.

FIG. 4A illustrates a circuit wherein capacitor $C_T$ [403a] is wired in series with diodes D1 [401a] and D2 [402a], and this series circuit is wired in parallel with capacitor C [404a].

Figure 4B:
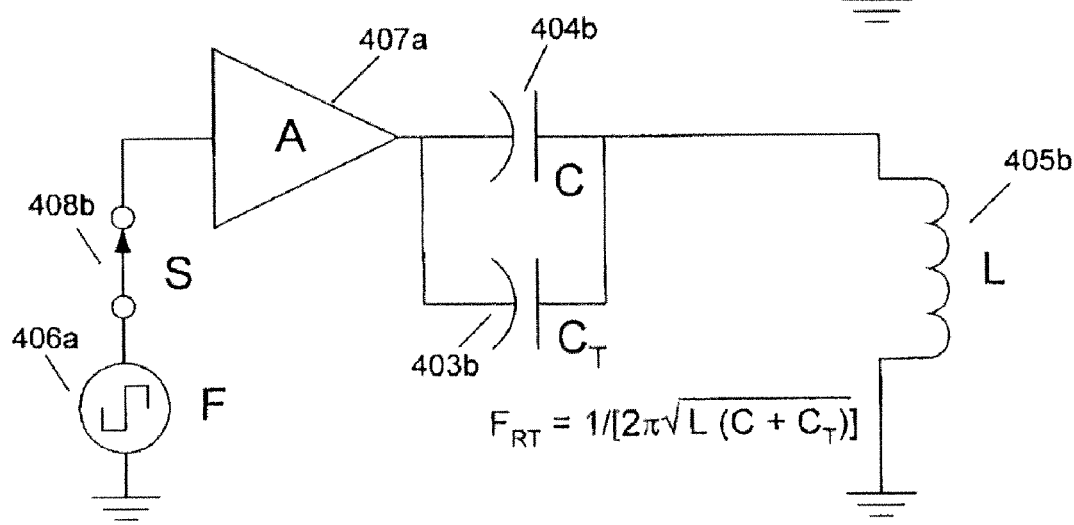
Figure 4C:
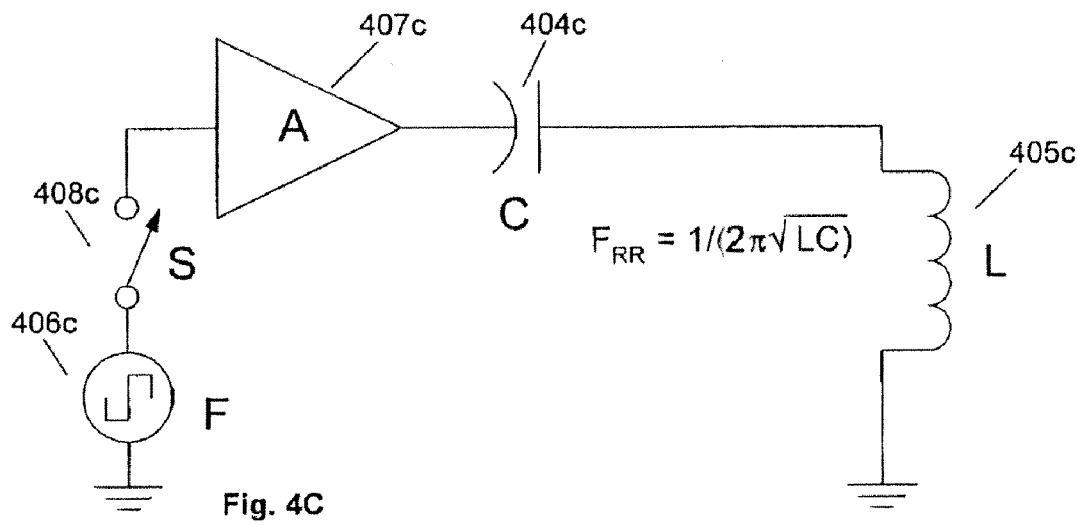

FIG. 4B shows the equivalent circuit during the activation signal transmit interval, and FIG. 4C shows the equivalent circuit during the receive interval. These equivalent circuits and the equations for the resonant frequency associated with each circuit reveal that the frequency shifting occurs in the wrong direction. That is, the resonant frequency during the receive interval is higher than the resonant frequency during the transmit interval. While this circuit would work perfectly well with a transponder whose FSK frequencies are so designed, the HDX transponder of the present invention requires the receiver interval resonant frequency to be lower than the transmit interval resonant frequency.

Thus, what is required in order to use capacitor induced frequency shifting as an alternative to inductor induced frequency shifting is the circuit illustrated in FIG. 5A. In FIG. 5A, switches $S_1$ [508a] and $S_2$ [509a] operate synchronously, as indicated by dashed line [510a], but in opposing phase. That is, switch $S_1$ [508a] is closed when switch $S_2$ [509a] is open, and vice versa. As shown in FIG. 5B, with this opposite phasing, the resonant frequencies during the transmit and receive intervals are compatible with the HDX transponder of interest to the present invention.

For example, if the antenna inductor L [505a] value is 280 µH and capacitor C [504a] is 5000 pF, the transmit interval resonant frequency $F_{TT}$ is approximately 134.2 KHz. In order to shift the resonant frequency during the receive interval to $F_{RR}$=129.5 KHz, capacitor $C_T$ is calculated to be 394 pF.

In a fashion similar to that described earlier in connection with FIGS. 2A and 2B, the circuit of FIG. 6 provides the desired operation. In FIG. 6, the switches in FIG. 5A have been replaced with MOSFET transistors Q1 [608] and Q2 [609]. In a preferred embodiment, transistor Q1 [608] is an n-channel type MOSFET and transistor Q2 [609] is a p-channel MOSFET. Pulse signal R [610] drives the two MOSFETs, and their complementary n-channel and p-channel polarities cause their on/off states to be opposite in phase. Thus, Q1 [608] is in an on state when Q2 [609] is in an off state, and vice versa.

As is known to those of ordinary skill in the art, the polarities of MOSFETs Q1 [608] and Q2 [609] may be interchanged and the desired circuit operation preserved. Similarly, MOSFETs Q1 [608] and Q2 [609] can have identical polarities if they are driven out of phase by pulse signal R [210] and a pulse signal R* (not shown), where R* is the inverse, or phase opposite, of R. In other embodiments, Q1 [608] and Q2 [609] could be bipolar transistors or alternative switched semiconductor devices, such as silicon controlled rectifiers (SCRs), triacs, thyristors, and the like. Furthermore, transistor Q1 [608], which controls the on/off state of the activation signal, could be as effectively implemented as a digital logic gate or through microcontroller software control.

It will be recognized that the above-described invention may be embodied in other specific forms without departing from the spirit or essential characteristics of the disclosure.

Thus, it is understood that the invention is not to be limited by the foregoing illustrative details, but rather is to be defined by the appended claims.

The invention claimed is:

1. A tunable resonant circuit for a radio frequency identification (RFID) reader, wherein the reader transmits an activation signal to a transponder during a transmit interval and receives a transponder reply during a receive interval, the tunable resonant circuit comprising:
   at least one resonant frequency-determining element;
   a switched dynamic tuning network associated with the resonant frequency-determining element;
   a switching circuit responsive to a switching signal for tuning the resonant circuit to a first resonant frequency value during the transmit interval and to a second resonant frequency value during the receive interval.

2. The tunable resonant circuit of claim 1 wherein the dynamic tuning network is configured to adjust a value of at least one of a capacitive or inductive circuit element in response to the switching signal.

3. The tunable resonant circuit of claim 2 wherein the dynamic tuning network is configured to switch an inductive circuit element in and out of the resonant circuit in response to the switching signal.

4. The tunable resonant circuit of claim 2 wherein the dynamic tuning network is configured to switch a capacitive circuit element in and out of the resonant circuit in response to the switching signal.

5. The tunable resonant circuit of claim 1 wherein the first resonant frequency value is 134.2±2 kHz.

6. The antenna circuit of claim 1 wherein the second resonant frequency value is 129.2±2 kHz.

7. The tunable resonant circuit of claim 1 wherein the at least one resonant frequency-determining element is an antenna coil.

8. The tunable resonant circuit of claim 7 further comprising at least a second resonant frequency-determining element, said second resonant frequency-determining element being a capacitor.

9. The tunable resonant circuit of claim 1 wherein the switching circuit comprises a semiconductor device.

10. The tunable resonant circuit of claim 9 wherein the switching circuit comprises a MOSFET device.

11. The tunable resonant circuit of claim 10 wherein the switching circuit comprises first and second MOSFET devices.

* * * * *